United States Patent [19]

Friedland et al.

[11] 4,356,840
[45] Nov. 2, 1982

[54] DIGITAL FLUID FLOW CONTROL SYSTEM

[75] Inventors: Harry Friedland, Salt Lake City, Utah; Addison W. Langill, Jr., Balboa, Calif.

[73] Assignee: Powell Industries, Inc., Houston, Tex.

[21] Appl. No.: 193,035

[22] Filed: Oct. 2, 1980

Related U.S. Application Data

[63] Continuation of Ser. No. 689,071, May 24, 1976, Pat. No. 4,244,396, which is a continuation of Ser. No. 432,153, Jan. 10, 1974, abandoned, which is a continuation-in-part of Ser. No. 169,930, Aug. 9, 1971, Pat. No. 3,785,389, which is a continuation-in-part of Ser. No. 142,681, May 12, 1971, abandoned.

[51] Int. Cl.³ .................................................. G05D 7/06
[52] U.S. Cl. .................................... 137/487.5; 137/599
[58] Field of Search ................ 137/487.5, 599; 91/31

[56] References Cited

U.S. PATENT DOCUMENTS

| | | | |
|---|---|---|---|
| 1,436,417 | 11/1922 | Trumble | 137/599 |
| 2,589,373 | 3/1952 | Hammock | 137/599 |
| 3,115,923 | 12/1963 | Kellner | 137/599 |
| 3,308,619 | 3/1967 | Richardson et al. | 137/599 X |
| 3,331,393 | 7/1967 | Ernyei | 137/599 |
| 3,502,105 | 3/1970 | Ernyei et al. | 137/599 UX |
| 3,513,876 | 5/1970 | Tarbox | 137/608 X |
| 3,516,436 | 6/1970 | Klaus | 137/608 X |
| 3,517,552 | 6/1970 | Converse | 73/118 |
| 3,530,884 | 9/1970 | Kutze | 137/608 |
| 3,646,963 | 3/1972 | Klee | 137/608 |
| 3,654,960 | 4/1972 | Kiernan | 137/608 |

Primary Examiner—Robert G. Nilson
Attorney, Agent, or Firm—Christie, Parker & Hale

[57] ABSTRACT

In a digital fluid flow control system having a source of fluid at a first pressure and a fluid receiver at a second pressure lower than the first pressure, individually actuatable, digital valve elements interconnect the source to the receiver. In the flow passage of each valve element, there is an isolating orifice at which the pressure is independent of variations in the second pressure, by virtue of the difference between the first and second pressures. The isolating orifice of each valve element is preferably the throat of a converging-diverging nozzle that feeds into the receiver. In one implementation, spaced axially aligned upstream and downstream conduits are formed in a valve body; radial passages in which digital valve elements are located interconnect the conduits.

29 Claims, 9 Drawing Figures

DIGITAL FLUID FLOW CONTROL SYSTEM

CROSS REFERENCE TO RELATED APPLICATIONS

This application is a continuation of application Ser. No. 689,071, filed May 24, 1976, now U.S. Pat. No. 4,244,396, which is a continuation of application Ser. No. 432,153, filed Jan. 10, 1974, now abandoned, which is a continuation-in-part of our application, Ser. No. 169,930, filed Aug. 9, 1971, now U.S. Pat. No. 3,785,389, which is a continuation-in-part of application Ser. No. 142,681, filed May 12, 1971, now abandoned.

BACKGROUND OF THE INVENTION

This invention relates to the control of fluid flow and, more particularly, to a digital fluid flow control system in which the flow rate is independent of variations in downstream pressure.

In a digital fluid flow control system, a plurality of individually actuatable, digital valve elements are interconnected between an upstream manifold and a downstream manifold. The digital valve elements are bistable, i.e., either open or closed, and are actuated by binary electrical signals weighted in value according to a binary code. The cross-sectional orifice areas of the valve elements are also weighted relative to each other according to the binary code. The fluid flow rate from the upstream manifold to the downstream manifold is controlled by opening and closing the valve elements in different combinations, responsive to the binary actuating signals; due to the identical weighting of the binary actuating signals and the orifice areas of the valve elements, the sum of the orifice areas of the open valve elements proportional to the number represented by the binary actuating signals in the binary code.

In industry, closed loop fluid flow control systems are used extensively to automate fluid processes. Typically, a digital computer generates actuating signals for the flow control system responsive to transducers indicating the dynamic conditions in the process. The fluid flow rate through a control valve is a known function of upstream pressure, downstream pressure, orifice area, and fluid characteristics. In a digital fluid flow control system, the orifice area is determined by the states of the digital valve elements and accordingly by the number represented by the actuating signals in the binary code; the principle variables to be measured are upstream and downstream pressure, and in the case of a gas, temperature. The dependence of the flow rate on downstream pressure complicates the calculation of flow rate and the measurements upon which such calculations are based, particularly in the case of a gas, where the flow rate is a complex function of the ratio of upstream pressure to downstream pressure.

It is advantageous from a manufacturing point of view to construct a digital fluid flow control system having a unitary valve body into which the necessary manifolds and access openings for digital valve elements are formed by drilling bores. However, such a construction is not possible with existing radial configurations of digital fluid flow control systems.

SUMMARY OF THE INVENTION

According to one aspect of the invention, the difference between the upstream and downstream pressure in a closed loop digital fluid flow control system is maintained sufficiently high to make the pressure at the orifices of the open digital valve elements independent of variations in downstream pressure. As a result, the orifices in effect isolate the upstream manifold from the downstream manifold. The calculation of the flow rate and necessary measurements are thereby simplified considerably. Preferably, each isolating orifice is the throat of a converging-diverging nozzle that feeds into the downstream manifold without constriction. A converging-diverging nozzle permits larger pressure recovery in the downstream manifold and it stabilizes the effective orifice area of the digital valve element when the isolating orifice is the flow determining orifice.

If the fluid is a gas, the difference between the upstream and downstream pressure is maintained sufficiently high to establish sonic flow through the isolating orifices, i.e., flow at sonic velocity. As a result, the pressure at the isolating orifices is a constant fraction of the upstream pressure, irrespective of variations in the downstream pressure.

If the fluid is a liquid, the difference between the upstream and downstream pressures is maintained sufficiently high to establish the vapor phase of the liquid at the isolating orifices. As a result, the pressure at the isolating orifices is equal to the vapor pressure of the liquid, which is a constant at any given temperature, irrespective of variations in the downstream pressure.

According to another aspect of the invention, a digital fluid flow control system is constructed to have a valve body made from one piece of material. Axially aligned, spaced apart upstream and downstream conduits in the valve body are interconnected by radial flow passages in the valve body, in which individually actuatable digital valve elements are disposed. The upstream and downstream conduits, the radial flow passages, and the access openings into the valve body for the digital valve elements are all formed by drilling bores in the valve body. Preferably, each radial passage comprises the following: a bore parallel to the upstream and downstream conduits, laterally displaced therefrom, and extending therebetween; one perpendicular bore connecting the upstream conduit with the parallel bore near one end; and another perpendicular bore connecting the downstream bore with the parallel bore near the other end.

BRIEF DESCRIPTION OF THE DRAWINGS

The features of the specific embodiments of the best mode contemplated of carrying out the invention are illustrated in the drawings, in which.

DETAILED DESCRIPTION OF THE SPECIFIC EMBODIMENTS

Figure 1:
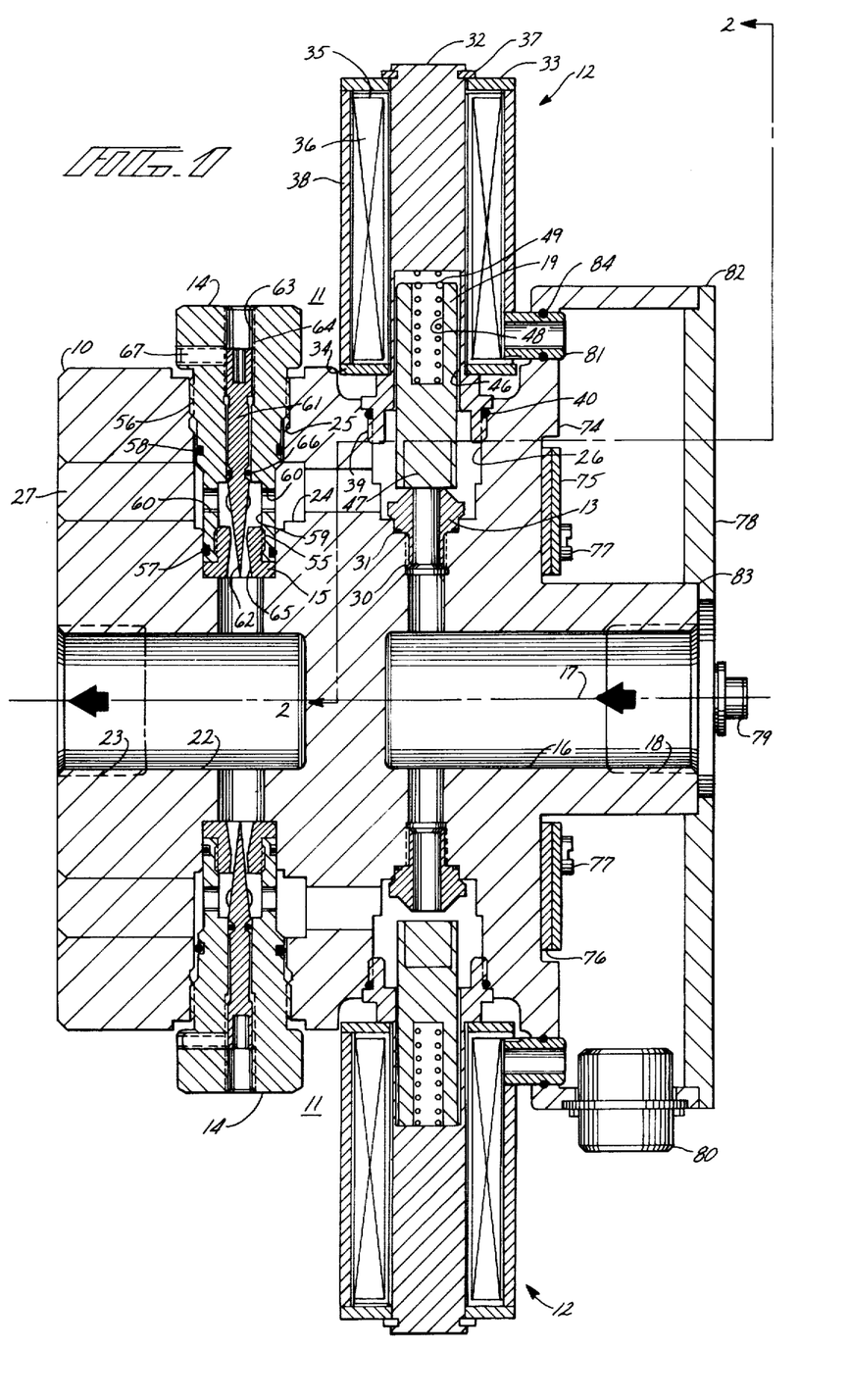
FIG. 1 is a side, partially sectional view of a digital fluid flow control system incorporating the principles of the invention.
Figure 2:
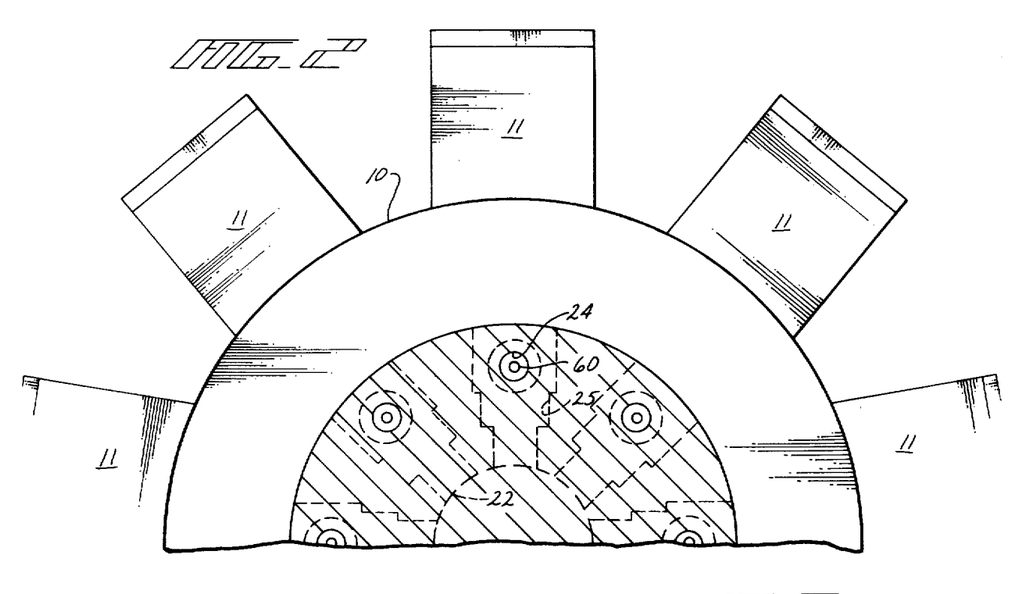
FIG. 2 is a fragmentary front view of the system of FIG. 1.

Reference is made to FIGS. 1 and 2 in which a digital fluid flow control system primarily designed to handle a compressible fluid such as air, which comprises a valve body 10 and a plurality (i.e. nine) of digital valve elements 11. Each of valve elements 11 has a plug actuating assembly 12, a sealing orifice insert 13, an adjustment insert 14, and an isolating orifice insert 15.

Valve body 10 is made from a single substantially cylindrical piece of material not chemically reactive with the fluid, such as iron. An upstream conduit 16 is drilled in valve body 10 from one end surface thereof in alignment with a cylindrical axis 17 of body 10. Threads 18 are formed at the entrance of conduit 16 for connection to a source of compressible fluid, e.g. air (not shown). A downstream conduit 22 is drilled in valve body 10 from the opposite end surface thereof in alignment with axis 17. Threads 23 are formed at the entrance of conduit 22 for connection to a fluid receiver (not shown). As shown by the solid arrows fluid flows along axis 17 from right to left as viewed in FIG. 1. For each valve element 11, a bore 24 is drilled in valve body 10 from its downstream end surface spaced laterally from and parallel to axis 17, a bore 25 is drilled perpendicular to axis 17 in valve body 10 from its cylindrical side surface through bore 24 to downstream conduit 22; and a bore 26 is drilled perpendicular to axis 17 in valve body 10 from its cylindrical side surface through bore 24 to upstream conduit 16. The end of bore 24 of each valve element 11 between bore 25 and the downstream end surface of valve body 10 is sealed by a plug 27 made of the same material as valve body 10.

Insert 13 has a threaded connection 30 with the portion of bore 26 between bore 24 and upstream conduit 16. Threaded connection 30 is sealed by an O-ring 31. Plug actuating assembly 12 overlies insert 13 in axial alignment therewith. Assembly 12 comprises a core 32 made of a magnetic material, annular end caps 33 and 34 made of a magnetic material, a bobbin 35 made of a non-magnetic material, an electric coil 36 wrapped around bobbin 35, a snap ring 37 made of a magnetic material, and a hollow cylindrical cover 38 made of a magnetic material. Core 32 has a threaded connection 39 with the portion of bore 26 between bore 24 and the exterior of valve body 10. An O-ring 40 seals threaded connection 39. Bobbin 35 and coil 36 fit around core 32. End cap 34 at one end of bobbin 35 is retained by an annular shoulder formed on core 32 and end cap 33 at the other end of bobbin 35 is retained by a snap ring 37, which is secured in a groove at the end of core 32. Cover 38 is retained between end caps 33 and 34.

A plug 19, which is made of a magnetic material, rides back and forth in a direction perpendicular to axis 17 within a recess 46 in core 32. Plug 19 has a sealing insert 47 made of a suitable sealing material such as an elastomer rubber at its end facing orifice insert 13. Plug 19 has a recess 48 that retains a compression spring 49 at its end opposite orifice insert 13. In the absence of the application of an actuating signal to coil 36, spring 49 urges plug 19 downward to press sealing insert 47 against orifice insert 13, thereby closing the digital valve element. When a binary actuating signal is applied to coil 36, an external magnetic flux path is established in core 32, plug 19, end cap 34, cover 38, and end cap 33. The resulting magnetic force overcomes spring 49 and draws plug 19 up against core 32, thereby opening the digital valve element.

Isolating orifice insert 15 rests on a shoulder formed in bore 25, where it is retained by adjustment insert 14. Adjustment insert 14 has a threaded connection 55 with orifice insert 15 and a threaded connection 56 with bore 25. O-rings 57 and 58 seal insert 14. A cavity 59 is formed within insert 14 and perforations 60 connect bore 24 with cavity 59. Perforations 60 are as large and numerous as possible to prevent restriction of flow therethrough. An adjusting screw 61 having a conical end 62 resides in a bore 63, which extends between the exterior of insert 14 and cavity 59. Screw 61 has a threaded connection 64 with bore 63. An O-ring 66 seals threaded connection 64. A converging-diverging nozzle 65 is formed in insert 15 to interconnect the interior of cavity 59 with bore 25. Conical end 62 of screw 61 extends through the throat of nozzle 65. As screw 61 is adjusted, end 62 moves axially and the effective cross-sectional area of nozzle 65 varies.

At its upstream end, valve body 10 has an annular cavity 74 around upstream conduit 16 for housing the electrical components that drive actuating assemblies 12. The electrical components are mounted on an annular terminal board 75, which together with an annular backup board 76 are attached to valve body 10 by fasteners such as that designated 77. An annular cover 78 is secured to valve body 10 by fasteners such as that designated 79. Binary electrical actuating signals from a digital computer or other source are coupled through a connector 80 to the components on terminal board 75. The actuating signal for driving plug actuating assembly 12 of each valve element 11 is coupled from cavity 74 to coil 36 by a conduit 81 that extends between cavity 74 and cover 38. Gaskets 82 and 83 seal the interface of cover 78 and valve body 10. An O-ring 84 seals the point of exit of each conduit 81 from cavity 74. As a result, cavity 74 is completely sealed and can be purged for the purpose of maintaining a non-explosive and/or cooling environment for terminal board 75.

When a binary actuating signal is applied to coil 36 of one of valve elements 11, plug 19 is lifted off orifice insert 13 and the valve element is in its open state. Fluid then flows from upstream conduit 16 to downstream conduit 22 through a flow passage comprising bore 26, insert 13, bore 24, perforations 60, cavity 59, nozzle 65, and bore 25.

Nozzle 65 is the flow determining orifice in the flow passage through an open valve element 11. The ratio of the cross-sectional areas of nozzles 65 is in accordance with the weighting of the binary signals that actuate them. Thus, for example, the ratio of the cross-sectional areas of nozzles 65 could vary in accordance with a straight geometric progression of two (i.e., 1, 2, 4, 8, 16, 32, 64, 128, 256) or could vary in accordance with a modified geometric progresson of 2, (i.e., 1, 2, 4, 8, 16, 32, 32, 32). Trim adjustment of the ratio of effective cross-sectional areas of nozzles 65 is accomplished by turning screw 61. The trim adjustment is maintained by a set screw 67. The other dimensions of the flow passages through digital valve elements 11 are all identical and substantially larger than the cross-sectional dimensions of nozzles 65.

For a given pressure in upstream conduit 16, the pressure in downstream conduit 22 varies as valve elements 11 are opened and closed; the minimum pressure difference occurs when all of valve elements 11 are open. The sum of all the flow determining orifices of valve elements 11 is designed to be small enough vis-a-vis the external "plumbing" to which the flow control system is connected and sufficient pressure is provided in upstream conduit 16 so that the fluid flowing through the open digital valve elements 11 travels at sonic velocity at the throat of nozzle 65 for all combinations of states of valve elements 11. As a result, the throat of nozzles 65 serve to isolate the upstream portions of the passages through the valve elements from the downstream portions thereof, which are subject to pressure variations as the pressure in downstream conduit 22 varies. In other words, pressure variations in downstream conduit 22 do not affect the flow rate through an open digital valve element 11, which is solely determined by the pressure and temperature in upstream conduit 16.

To summarize, in this embodiment of the invention, nozzles 65 serve as both the isolating orifices and the flow determining orifices of digital valve elements 11. As taught in our application Ser. No. 169,930, the flow rate through open digital valve elements 11 remains essentially unaffected by variations in the position of plug 19. The flow determining orifices are substantially smaller than the sealable orifices so the flow rate essentially is only dependent upon the cross-sectional area of the flow determining orifices.

Figure 3:
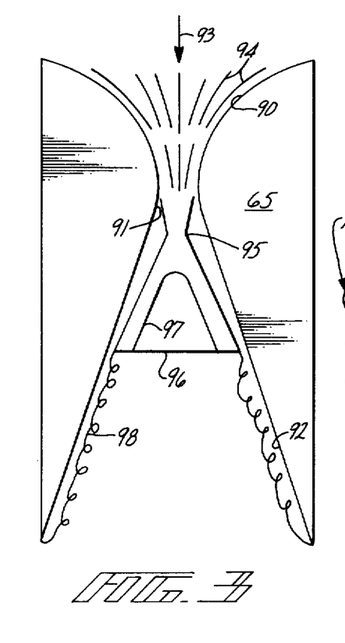
FIG. 3 is a schematic diagram of the converging-diverging nozzle comprising the isolating orifice of the digital valve elements of FIG. 1.

Reference is made to FIG. 3 for an enlarged schematic diagram of one of nozzles 65 to illustrate its contour. Nozzle 65 has a curved converging inlet section 90, a throat 91, and a straight diverging section 92. The fluid flows through nozzle 65 in the direction of an arrow 93. As indicated by flow lines 94, the fluid converges and accelerates as it passes through converging section 90 to a minimum pressure and sonic velocity at a vena contracta 95 slightly downstream of throat 91. The cross-sectional area of vena contracta 95 is the effective cross-sectional throat area of nozzle 65. Downstream of vena contracta 95 the gas further accelerates to supersonic velocity to a point within diverging section 92, where a strong shock wave 96 is formed. A pressure cone 97 is formed between shock wave 96 and vena contracta 95. Diverging section 92 forms a small angle e.g., 6°, with the axis of nozzle 65, i.e., with the direction of flow through nozzle 65, so boundary layer turbulence 98 is set up downstream of shock wave 96. As the pressure downstream of nozzle 65 decreases, assuming a constant pressure upstream of nozzle 65, shock wave 96, pressure cone 97, and vena contracta 95 all move downstream toward the exit of nozzle 65, but boundary layer 98 does not permit vena contracta 95 to enlarge in cross-sectional area. As long as diverging section 92 is long enough to contain shock wave 96 and pressure cone 97, the cross-sectional area of vena contracta 95 remains constant and no increase in the flow rate through nozzle 65 occurs as the pressure downstream thereof decreases. Thus, the flow rate through nozzle 65 for a given upstream pressure and temperature is constant. Because of the gradual curvature of converging section 90 and the confinement of turbulence to boundary layer 98 in diverging section 92 very low frictional loss occurs in nozzle 65. In other words, nozzle 65 has a high efficiency. For example, a pressure recovery, i.e., ratio of pressure downstream of nozzle 65 to pressure upstream of nozzle 65, in the range of 85 to 92% is achieved for nearly ideal gases with sonic velocity at the throat of nozzles 65 in the system disclosed in FIGS. 1 and 2. With reference to the pressure versus distance curves for converging-diverging nozzles shown in FIG. 5.21(a) on page 140 of the text *The Dynamics and Thermodynamics of Compressible Fluid Flow*, Vol. 1, by Ascher H. Shapiro, The Ronald Press Company, New York, 1953, nozzle 65 is operating in regime II. In the manner described above, the system is designed so the pressure difference between conduits 16 and 22 is sufficiently high to maintain fluid flow at sonic velocity at throat 91 or slightly downstream thereof for all the combinations of states of the digital valve elements.

In summary, not only can fluid flow at sonic velocity be maintained with nozzles 65 in the presence of a small pressure difference, but a vena contracta with a constant cross-sectional area is formed in each of nozzles 65, despite variations in pressure downstream of nozzles 65. Thus, the flow rate through nozzles 65 is independent of variations in downstream pressure. In contrast, the flow rate through a sharp edged orifice varies somewhat as a function of downstream pressure even when fluid is flowing through the orifice at sonic velocity, because of the variations in cross-sectional area of the vena contracta formed downstream of the orifice (see FIG. 4.17 on page 100 of the text *The Dynamics and Thermodynamics of Compressible Fluid Flow*), and a large pressure difference is required to maintain fluid flow at sonic velocity. Therefore, properly designed converging-diverging nozzles are preferable to sharp edged orifices as the flow determining orifices. However, the invention also contemplates the use of sharp edged orifices with a minimum pressure difference between conduits 16 and 22 sufficient to maintain the critical pressure ratio across the orifices for all combinations of states of valve elements 11. The sharp edged orifices could be formed in inserts 15, instead of nozzles 65. In the case of sharp edged orifices, a smaller pressure recovery is obtained, i.e., for air 52% or less.

Figure 4:
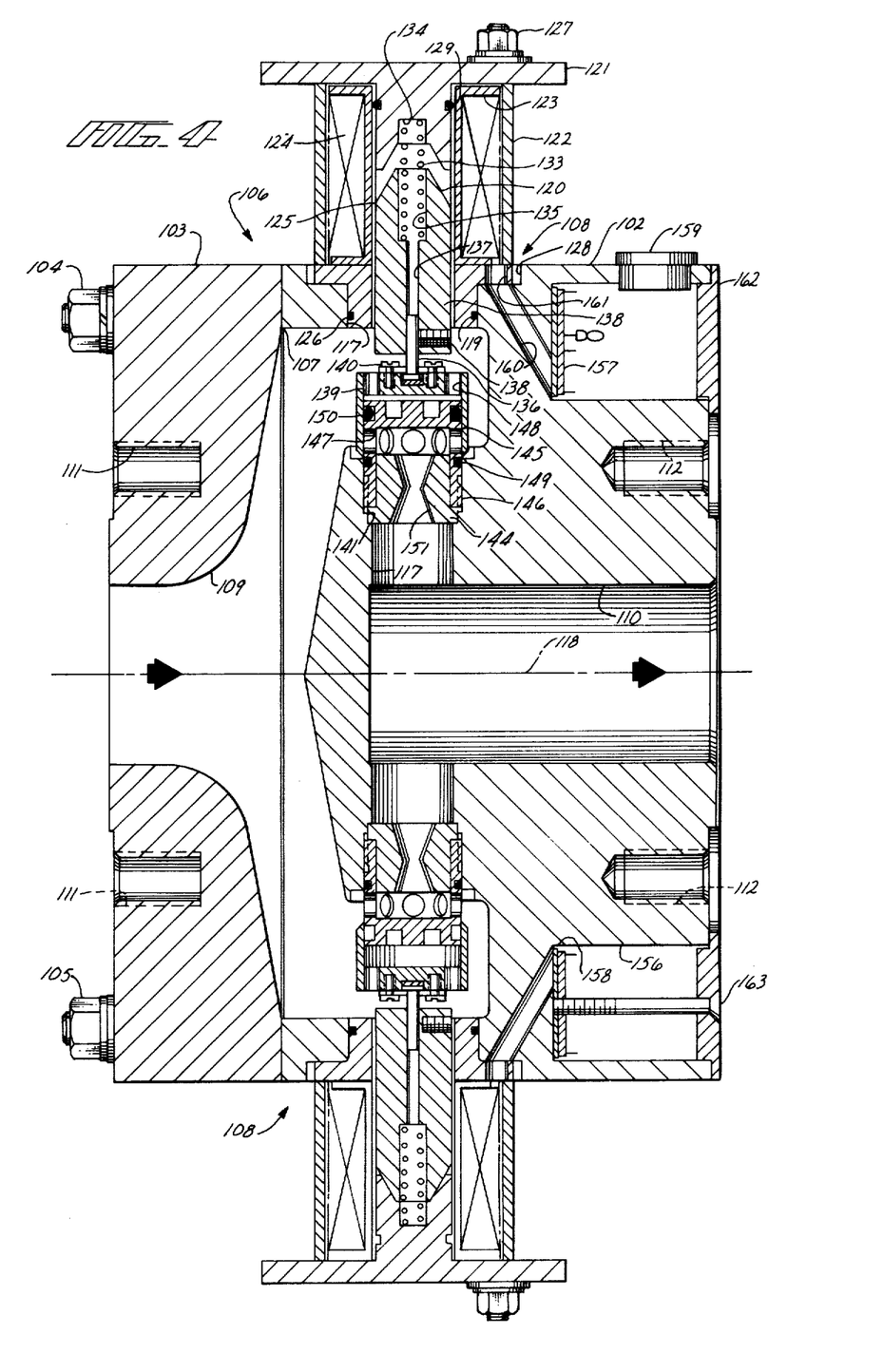
FIG. 4 is a side sectional view of another digital fluid flow control system incorporating the principles of the invention.

In FIG. 4 is shown a fluid flow control system primarily designed to handle a liquid such as water. Members 102 and 103 are bolted together by fasteners such as 104 and 105 to form a generally cylindrical valve body 106 along an axis 118. The interface between members 102 and 103 is sealed by a gasket 107. A plurality of individually actuatable digital valve elements 108 are interconnected between an upstream manifold 109 and a downstream manifold 110. A plurality of threaded holes 111 are formed in the upstream end surface of the valve body 106 for bolting a mounting flange of an incompressible fluid source such as water to upstream manifold 109. A plurality of threaded holes 112 are formed in the downstream end surface of valve body 106 for bolting a mounting flange of a fluid receiver to downstream manifold 110. As shown by the solid arrows, fluid flows along axis 118 from left to right, as viewed in FIG. 4.

For each digital valve element 108, a bore 117 is formed in valve body 106 perpendicular to axis 118 from the cylindrical side surface of valve body 106 to downstream manifold 110. Each digital valve element 108 has a plug actuating assembly comprising a base 119 made of magnetic material, a core 120 made of magnetic material, end cap 121 made of magnetic material, a hollow cylindrical cover 122 made of magnetic material, a bobbin 123 made of non-magnetic material, an electric coil 124 wrapped around bobbin 123, and a sleeve 125 inside bobbin 123 made of non-magnetic material. Base 119 fits into the portion of bore 117 between upstream manifold 109 and the exterior of valve body 106 and an O-ring 126 seals this portion of bore 117. Cover 122 surrounds coil 124, bobbin 123 and sleeve 125. End cap 121 overlies one end of cover 122. A central portion of end cap 121 extends into sleeve 125 to serve as a stop for the movement of core 120, which rides up and down within sleeve 125. End cap 121 is secured to valve body 106 by fasteners such as that designated 127. Base 119 bottoms on a recess 128 at the entrance of bore 117 and cover 122 is held by base 119 and end cap 121, thereby also securing the other components of the plug actuating assembly. An O-ring 129 seals the interface between end cap 121 and sleeve 125. A compression spring 133 is retained by recesses 134 and 135 in end cap 121 and core 120, respectively. A stem 136 is retained by a set screw 138 in a bore 137 formed in core 120.

Stem 136 is secured to a plug 139 by fasteners 140. An isolating orifice insert 144 rests on a shoulder 141 formed in bore 117. A stationary cage 145, over which plug 139 rides up and down has a threaded connection 146 with bore 117. Cage 145 is threaded into bore 117 until it bears against and retains insert 144. Cage 145 has a plurality of perforations 147 formed in its side to interconnect upstream manifold 109 with the interior of cage 145. The top of plug 139 has a plurality of holes 148 for equalizing the pressure in the region between plug 139 and cage 145.

In the absence of a binary electrical actuating signal to coil 124, spring 133 urges plug 139 downward, to completely cover cage 145 and thereby close the digital valve element. In this state, the end of plug 139 contacts an O-ring 149, which seals the interface between bore 117 and cage 145 and the bottom of plug 139. An O-ring 150 seals the top of plug 139. When a binary electrical actuating signal is applied to coil 124, there is established an external magnetic flux path that draws core 120 up against cap 121 and lifts plug 139 off cage 145, thereby opening the digital valve element. The depth of penetration of stem 136 into bore 137 is adjusted so the end of plug 139 lies above perforations 147 in cage 145 when the digital valve element is open. As a result, any changes in the position of plug 139 that occur in the course of time do not modulate the flow rate through perforations 147.

A converging-diverging nozzle 151 is formed in insert 144. As described below in connection with FIG. 5, the difference between the pressure of the fluid source and the pressure of the fluid receiver is sufficiently high and the design of nozzle 151 is such that the fluid is in its vapor phase at the throat of nozzle 151. Consequently, nozzle 151 of each open digital valve element operates as a so-called cavitating venturi and isolates such element from variations in downstream pressure as the different valve elements open and close.

As in the case of the system of FIGS. 1 and 2, nozzles 151 are the flow determining orifices and their respective cross-sectional areas are weighted in accordance with the weighting of the binary actuating signals. The other dimensions of the respective flow passages through valve elements 108, including the size and number of perforations 147 are all identical from element to element and as large as possible.

An annular cavity 156 is formed in the downstream end of valve body 106. One or more terminal boards 157 and corresponding back-up boards 158 are mounted in cavity 156 by means not shown. The binary actuating signals for digital valve elements 108 are coupled to terminal boards 157 in cavity 156 through a connector 159. From terminal boards 157 the wires for actuating coil 124 of each of valve elements 108 pass to the plug actuating assembly through a bore 160 in valve body 106 and a bore 161 in base 119. Cavity 156 is enclosed by an annular cover 162 that is secured to valve body 106 by screws such as that designated 163.

Figures 5, 6:
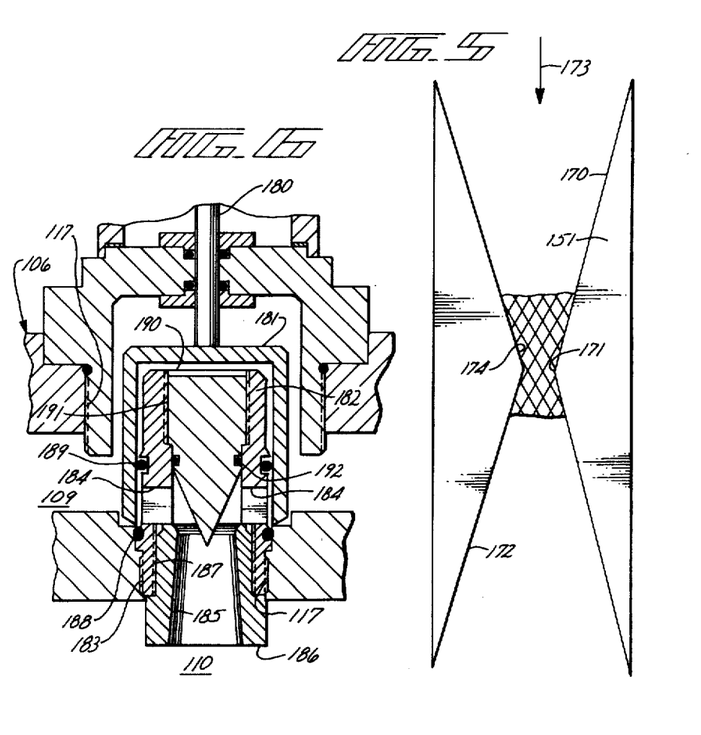
FIG. 5 is a schematic diagram of the converging-diverging nozzle comprising the isolating orifice of the digital valve elements of FIG. 4.
FIG. 6 is a side sectional view of an alternative version of a digital valve element that may be employed in the system of FIG. 4.

FIG. 5 is a schematic diagram showing the contour of nozzle 151, which has a straight converging inlet section 170, a throat 171, and a straight diverging outlet section 172. When the digital valve element is open, fluid in the liquid phase flows through nozzle 151 in the direction of an arrow 173. It should be noted that converging section 170 is long and has a small angle of convergence. With a properly designed nozzle contour as shown and a sufficiently high difference between the fluid pressure upstream of nozzle 151 and the fluid pressure downstream of nozzle 151, the fluid passing through converging section 170 accelerates to a sufficiently high velocity that the static pressure drops to the vapor pressure of the fluid in the vicinity of throat 171. This is represented by a cross-hatched region 174. The gas or vapor phase of the fluid is maintained around throat 171. After the fluid passes throat 171, it begins to decelerate. The accompanying rise in static pressure terminates the vapor phase and the fluid flows to the exit of nozzle 151 in the liquid state. As a result of the constant vapor pressure at throat 171, variations in pressure downstream of nozzle 151 do not influence the flow rate therethrough. In other words, the portion of a digital valve element upstream of nozzle 151 is isolated from downstream manifold 110. The flow rate through the digital valve element is proportional to the difference between the pressure of the fluid source and the vapor pressure of the fluid, which is a constant for a given temperature. The isolating orifice provided by nozzle 151 feeds directly into downstream manifold 110, as in the system disclosed in FIGS. 1 and 2.

Nozzle 151 provides controlled cavitation and eliminates a vena contracta downstream of nozzle 151. In other words, cavitation takes place in the vicinity of throat 171 so the gas phase of the fluid is continuously maintained at that point to provide the desired isolation from downstream manifold 110 and the fluid stream is not subject to any restrictions downstream of throat 171. In contrast, if a sharp edged orifice were employed, the fluid in the orifice plane is not maintained in the gas phase. Sporadic uncontrolled cavitation may occur downstream of the sharp edged orifice. Such cavitation would cause pressure perturbations in downstream manifold 110 which influence the flow rate through the digital valve elements. Further, a sharp edged orifice causes a downstream vena contracta having a pressure dependent cross section, unless the streams from the different valve elements are directed at each other to dissipate the vena contracta as taught in application Ser. No. 64,142, filed Aug. 3, 1970, the disclosure of which is incorporated herein by reference. Thus, although the system of FIG. 4 directs the streams from valve elements 108 at each other, that would not be necessary to avoid pressure dependent vena contractas because of nozzles 151. Therefore, the invention also contemplates the use of cavitating nozzles, such as nozzles 151 in a digital fluid flow control system in which the fluid streams from the valve elements are not directed at each other.

If the minimum pressure difference between manifolds 109 and 110, i.e. the pressure difference when all of valve elements 108 are in the open state, is about 10% of the pressure in upstream manifold 109 or greater, the desired cavitation takes place in nozzles 151, as described. The sum of all the flow determining orifices of valve elements 108 is designed to be small enough vis-a-vis the external "plumbing" to which the flow control system is connected to provide the required minimum pressure difference.

The digital fluid flow control systems disclosed and claimed in the specification could be employed in a number of different environments. For example, these systems could be employed as module 10 in FIG. 1 of application Ser. No. 169,930, which matured into U.S. Pat. No. 3,785,389 on Jan. 15, 1974; as elements 35 through 44 in FIGS. 1A, 1B and 1C of the co-pending Gallatin and Langill application filed on even date herewith, which issued as U.S. Pat. No 3,875,955 on Apr. 8, 1975; or module 12 in FIG. 1 of U.S. Pat. No. 3,726,296, issued on Apr. 17, 1973. These three disclosures are all incorporated herein by reference.

Figure 7:
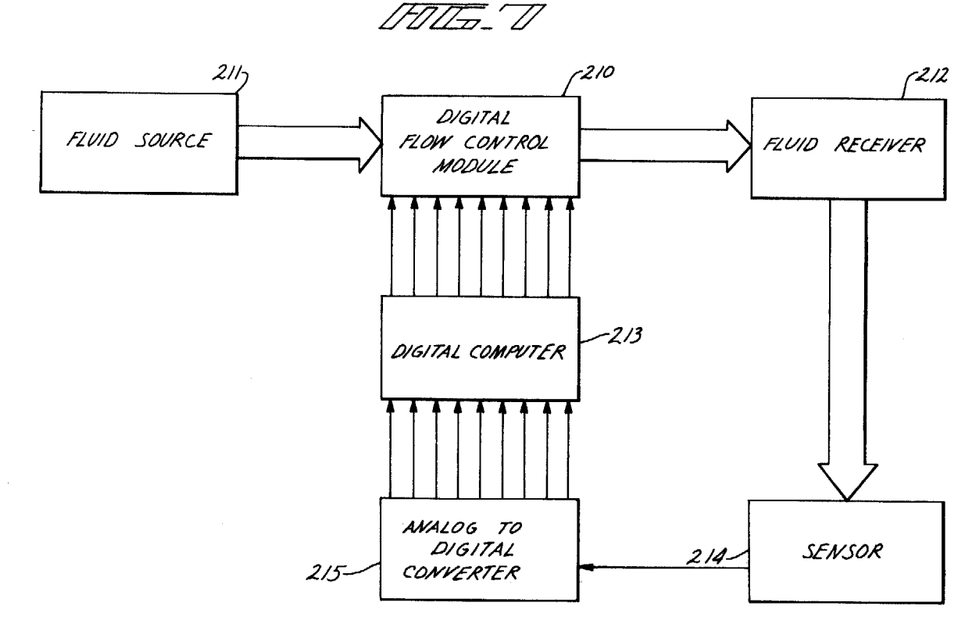
FIG. 7 is a schematic block diagram of one embodiment of a closed loop fluid flow control system incorporating the principles of the invention.

Thus, as disclosed in U.S. Pat. No. 3,785,389, the digital fluid flow control system of FIG. 1 or FIG. 4 could be employed as a digital flow control module 210 (FIG. 7). In FIG. 7, the single lined arrows represent electrical connections and the solid double lined arrows represent fluidic connections. Module 210 controls the flow rate from a fluid source 211 to a fluid receiver 212, at a lower pressure than source 211. Source 211 and receiver 212 could be conduits in a fluid transmission, metering, or mixing system that are respectively upstream and downstream of module 210. The output of a digital computer 213 comprises a plurality of binary signals together representing in a weighted binary code a digital command for establishing the flow rate through module 210. The dynamic conditions of the fluid at receiver 212 are detected by a sensor 214, which produces one or more electrical feedback signals representative of these dynamic conditions. The electrical feedback signal is coupled from sensor 214 to an analog-to-digital converter 215, where it is converted to a binary representation for application to digital computer 213. Digital computer 213 continually readjusts the command signal on the basis of the changes of the dynamic conditions detected by sensor 214.

Figure 8:
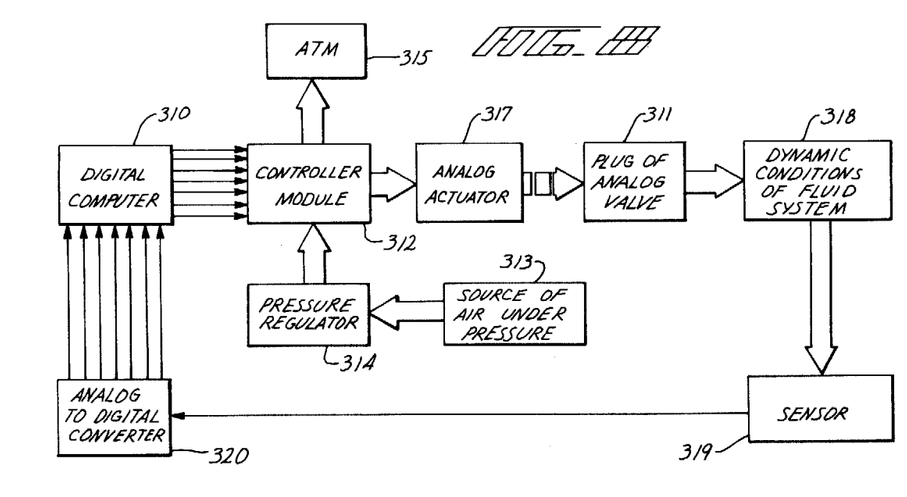
FIG. 8 is a schematic block diagram of another embodiment of a closed loop fluid flow control system incorporating the principles of the invention.

Thus, as disclosed in U.S. Pat. No. 3,726,296, the digital fluid flow control system of FIG. 1 or FIG. 4 could be employed as a controller module 312 (FIG. 8). In FIG. 8, the single lined arrows represent electrical connections, and the solid double lined arrows represent fluidic connections. A source 313 of air under pressure is supplied by a pressure regulator 314 to an upstream manifold or conduit in controller module 312. Regulator 314, which has an adjustable pressure setting, supplies air from source 313 to the upstream manifold so as to maintain the pressure in the upstream manifold constant. The digital valve elements couple the upstream manifold to a downstream manifold or conduit in controller module 312, and an exhaust orifice having a fixed cross-sectional area couples the downstream manifold to the atmosphere, represented in FIG. 8 by a block 315. The pressure established in the downstream, manifold and the air flow through the exhaust orifice depend upon the states, i.e., open or closed, of the individual digital valve elements, which are controlled by the respective binary output signals of a digital computer 310. The ratio of the absolute pressure in the upstream manifold to the absolute pressure in the downstream manifold is larger than the critical pressure ratio, i.e., about 2:1 for air, thereby providing sonic flow through the open digital valve elements.

The downstream manifold of controller module 312 is connected to a pressure responsive analog actuator 317 that is mechanically connected to a plug 311 of an analog valve. As represented by a block 318, the position of plug 311 affects the dynamic conditions of the fluid system, the dynamic conditions of the fluid system are detected by a sensor 319, which produces one or more feedback signals representative of the dynamic conditions. The electrical feedback signal is coupled from sensor 319 to an analog-to-digital converter 320, where it is converted to a binary representation for application to digital computer 310. Digital computer 310 continually readjusts the command signal on the basis of the change of the dynamic conditions detected by sensor 319.

Figure 9:
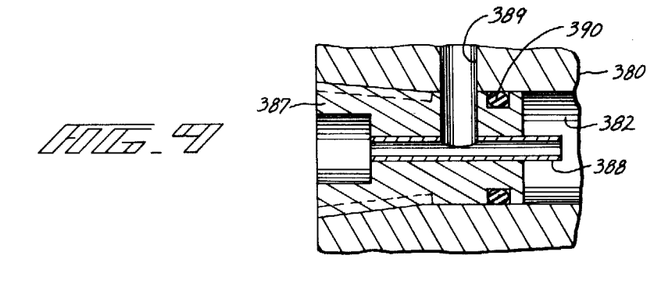
FIG. 9 is a fragmentary side sectional view of the downstream manifold or conduit of the controller module of FIG. 8 illustrating the exhaust orifice.

As represented in FIG. 9, the exhaust orifice coupling the downstream manifold to the atmosphere could comprise a threaded plug 387, a tube 388, and a conduit 389. Plug 387 seals the downstream manifold or conduit 382 in a block 380. One end of tube 388 fits into plug 387 so the other end of tube 388 extends into downstream manifold or conduit 382. Conduit 389 extends through plug 387 and block 380 between tube 388 and a cavity in block 380, not shown in FIG. 9. An O-ring 390 retained by a groove in plug 387 prevents leakage of air directly from manifold 382 to conduit 389. Air leaving downstream manifold 382 through tube 388 and conduit 389 passes from the cavity, not shown, to the atmosphere.

As used in this specification, the term "flow determining orifices" mean portions of the flow passages through the respective digital valve elements that have cross-sectional areas in a ratio equal to the weighting in the binary code or the binary signals actuating the digital valve elements.

In FIG. 6 is disclosed an alternative version of valve elements 108 in the system of FIG. 4, designed primarily for a compressible fluid such as air at high flow rates. The plug actuating assembly, which is not shown, could be a two stage arrangement, a pneumatic power stage controlled by a magnetic pilot stage, as disclosed in U.S. Pat. No. 3,746,041, the disclosure of which is incorporated herein by reference. The end of a stem 180, which is driven by the power stage of the actuating assembly, is attached to a movable plug 181. A stationary cage 182 over which plug 181 rides up and down has a threaded connection 183 with bore 117. Cage 182 has a plurality of perforations 184 formed in its side to interconnect upstream manifold 109 with the interior of cage 182. A converging-diverging nozzle 185 formed in an insert 186 leads from the interior of cage 182 to downstream manifold 110. Insert 186 has a threaded connection with cage 182. Nozzle 185, which is designed to operate in the manner described in connection with FIG. 3, has a short curved converging section and a long straight diverging section. When the valve element is in the closed state, the end of plug 181 contacts an O-ring 188, which seals the interface between bore 117 and cage 182 and the bottom of plug 181. An O-ring 189 seals the top of plug 181. When the digital valve element is in the open state, the end of plug 139 lies above perforations 147 in cage 145. An adjustable screw 190 has a threaded connection 191 sealed by an O-ring 192. The end of screw 190 has a conical surface that protrudes into nozzle 185. As screw 190 is turned, the axial movement of its conical surface changes the flow rate through nozzle 185, thereby providing a trim adjustment on the effective orifice area of the valve element.

The use of a screw trim adjustment in the nozzles of a digital fluid flow control system is described and claimed in a copending sole application of Robert Gallatin, Ser. No. 432,152 filed on Jan. 10, 1974 and assigned to the assignee of this application by an assignment recorded on even date herewith. In practice, each nozzle is built with dimensions about 5% larger than the calculated values and then each cage with insert is individually placed on a flow stand where it is calibrated exactly to the desired effective orifice area by turning the trim adjustment screw. Finally, each calibrated cage with insert is screwed as a unit into its bore 117. This procedure substantially facilitates manufacturing because close tolerances do not have to be held. This procedure also avoids having to place the entire system including the bulky valve body on the test stand for calibration, and permits easy replacement or readjustment of the flow determining orifices of the system.

Although conical trim adjusting surfaces, as shown, are preferred from the point of view of nozzle efficiency, the ends of the trim adjustment screws could be truncated or blunt. In either case, the effective orifice area of the nozzle changes as the screw moves axially. It is not necessary for the end of the trim adjustment screw to protrude to the throat of the nozzle; the screw must only protrude toward the nozzle enough to disrupt the flow in the converging section of the nozzle.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the system of FIGS. 1 and 2 could be employed to handle a liquid, in which case, nozzle 65 would preferably have the contour depicted in FIG. 5; the system of FIG. 4 could be employed to handle a compressible fluid in which case nozzle 151 would preferably have the contour depicted in FIG. 3; the version shown in FIG. 6 could be employed to handle a liquid in which case nozzle 185 would preferably have the contour depicted in FIG. 5; and the system of FIGS. 1 and 2 could flow fluid in the opposite direction, i.e., the plugs could be downstream of the flow determining and/or isolating orifices. Although it is preferable for the isolating orifices to serve as the flow determining orifices, as disclosed, the flow determining orifices could conceivably be elsewhere, i.e. the perforations in the cages; in this case the pressure at the flow determining orifices is also independent of the downstream pressure, by virtue of the isolating orifices. Instead of converging-diverging nozzles as the isolating orifices of the digital valve elements for a compressible fluid, sharp edged orifices could be employed, although the isolation would not be as complete as the isolation afforded by properly designed converging-diverging nozzles and higher pressure differences would be required to maintain sonic flow. In some cases, where extremely good accuracy is not required, only the valve elements with the larger orifice areas would need to have nozzles, i.e., cavitating venturis or sonic velocity gas nozzles, because they are the most influential in determining the flow rate.

What is claimed is:

1. A digital fluid flow control system comprising:
   an upstream fluid manifold;
   a downstream fluid manifold;
   a plurality of individually actuatable digital valve elements each having a fluid flow passage interconnecting the upstream manifold to the downstream manifold, a stationary cage formed in the flow passage, the cage having a perforated side connecting the interior of the cage with one of the manifolds and an open end connecting the interior of the cage with the other manifold, a converging-diverging nozzle located in the flow passage at the open end of the cage, and a bistable plug in the passage positionable exclusive in an open state in which the plug permits fluid flow through the passage or a closed state in which the plug prevents fluid flow through the passage; and
   means responsive to a plurality of binary signals for selectively positioning the plugs of the respective valve elements in the open or closed state.

2. The system of claim 1, additionally comprising means for connecting the upstream and downstream manifolds to external plumbing through which fluid to be controlled flows, the sum of the cross-sectional areas of the nozzles being small enough relative to the external plumbing so the pressure difference between the manifolds is sufficiently high for all combinations of states of the plugs to render the pressure at the nozzles of the valve elements having plugs in the open state independent of the pressure in the downstream manifold.

3. The system of claim 1, in which the plug of each valve element rides up and down over its cage, the plug covering the perforated side of the cage in the closed state and uncovering the perforated side of the cage in the open state.

4. The system of claim 1, in which the open end of the cage connects the interior of the cage with the downstream manifold.

5. A digital fluid flow control system comprising:
   a source of compressible fluid at a first pressure;
   a fluid receiver at a second pressure lower than the first pressure;
   an upstream manifold;
   a downstream manifold;
   means for connecting the upstream manifold to the source;
   means for connecting the downstream manifold to the receiver;
   a plurality of individually actuatable, digital valve elements each having a flow passage from the upstream manifold to the downstream manifold flow restricting orifice means with a given cross-sectional area in the flow passage, a bistable plug, and means responsive to a binary electrical signal for positioning the bistable plug exclusively in a first position that prevents fluid flow through the passage or a second position that permits fluid flow through the passage;
   the sum of the given cross-sectional areas of the orifice means being sufficiently small relative to the connecting means so the pressure difference between the upstream and downstream manifolds when the plugs of all the valve elements are in the second position is high enough for fluid flow at sonic velocity through the orifice means of all the valve elements;

means for sensing the dynamic conditions of the fluid in one of the manifolds; and means responsive to the sensing means for generating the binary electrical signals for positioning the plugs of the valve elements.

6. The system of claim 5, in which the orifice means of each valve element comprises the throat of a converging-diverging nozzle formed in the flow passage.

7. The system of claim 6, in which the diverging portion of each nozzle is long enough to contain the resulting shock wave for the maximum pressure difference between the upstream and downstream manifolds.

8. The system of claim 5, in which the orifice means is a sharp edged orifice and the minimum pressure difference is higher than the critical pressure ratio of the fluid.

9. The system of claim 5, in which the orifice means of at least some of the valve elements vary in accordance with a geometric progression.

10. The system of claim 5, in which the given cross-sectional areas of the flow restricting orifice means are smaller than the cross-sectional area of the remainder of the flow passages.

11. A digital fluid flow control system comprising:
a source of fluid at a first pressure;
a fluid receiver at a second pressure lower than the first pressure;
means for sensing the dynamic fluid conditions in the system;
means responsive to the sensing means for generating a plurality of binary signals;
a plurality of digital valve elements, each valve element having a fluid flow passage interconnecting the source to the receiver, flow determining orifice means in the passage, and means responsive to one of the binary signals for placing the valve element exclusively in an open state in which fluid flows through the passage or a closed state in which no fluid flows through the passage, the flow determining orifice means having cross-sectional areas in a ratio equal to the weighting of the respective binary signals in the binary code; and
means for rendering the pressure at the flow determining orifice means of each valve element in the open state insensitive to variations in the second pressure.

12. The system of claim 11, in which the flow determining orifice means of each digital valve element comprises the throat of a converging-diverging nozzle located in the passage and the rendering means comprise the converging and diverging portions of the nozzle.

13. The system of claim 12, in which the fluid is compressible and the difference between the first and second pressures is sufficiently high for flow at sonic velocity through the throat of the converging-diverging nozzle.

14. The system of claim 12, in which the fluid of the source is liquid and the difference between the first and second pressures is sufficiently high to maintain the gas phase of the fluid at the throat of the converging-diverging nozzle.

15. The system of claim 11, in which the cross-sectional areas of the flow determining orifice means of at least some of the valve elements vary in accordance with a geometric progression of two.

16. The system of claim 11, in which the cross-sectional area of the flow determining orifice means of each valve element is smaller than the cross-sectional area of the remainder of the flow passage of such valve element.

17. A digital fluid flow control system comprising:
a source of fluid at a first pressure;
a fluid receiver at a second pressure lower than the first pressure; and
a plurality of individually actuatable, digital valve elements each having a fluid flow passage interconnecting the source to the receiver, a converging-diverging nozzle having a throat with a flow determining cross-sectional area in the flow passage, a bistable plug disposed in the flow passage, a stationary cage formed in the passage, the cage having a perforated side connecting the interior of the cage with the source and an open end connecting the interior of the cage with the receiver, the converging-diverging nozzle of each digital valve element being located at the open end of the cage, and means for positioning the plug exclusively in an open position or a closed position, the plug covering the cage to prevent fluid flow through the passage in the closed position and uncovering the cage to permit fluid flow through the passage in the open position, the flow determining cross-sectional areas of at least some of the valve elements varying from one another;
the minimum difference between the first and second pressures being sufficiently high to render the pressure at the throats of the nozzles of the valve elements having open plugs independent of the second pressure.

18. The system of claim 17, in which the fluid is compressible, the difference between the first and second pressures is sufficiently high to maintain fluid flow at sonic velocity through the throat of the converging-diverging nozzle, and the nozzles are long enough to contain the resulting shock waves when their respective plugs are in the open state for the maximum difference between the first and second pressures.

19. The system of claim 17, in which the fluid is a liquid and the difference between the first and second pressures is sufficiently high to maintain the gas phase of the fluid at the throat of the converging-diverging nozzle.

20. The system of claim 17, in which the flow determining cross-sectional areas of at least some of the valve elements vary in accordance with a geometric progression of two.

21. A digital fluid control system comprising:
a valve body having an upstream fluid manifold connected in the system, a downstream fluid manifold connected in the system, and a plurality of fluid flow passages interconnecting the upstream manifold to the downstream manifold; and
a plurality of individually actuatable, digital valve elements in the respective flow passages each having a converging-diverging nozzle formed in the flow passage with a throat of a given cross-sectional area, a bistable plug in the passage, a stationary cage formed in the passage, the cage having a perforated side connecting the interior of the cage with one of the manifolds and an open end connecting the interior of the cage with the other manifold, the converging-diverging nozzle being located at the open end of the cage, and means responsive to a binary signal for positioning the plug exclusively to uncover the cage so fluid flow through the passage is permitted or to cover the cage so fluid flow through the passage is prevented;

the sum of the given cross-sectional areas of the throats of the nozzles being sufficiently small relative to the system in which the manifolds are connected so the pressure difference between the upstream and downstream manifolds when the plugs of all the valve elements are in the open state is high enough to render the pressure at the throats of the nozzles of the valve elements in the open state insensitive to variations in the pressure in the downstream manifold.

22. The system of claim 21, in which the cross-sectional areas of at least some of the flow restrictive orifice means follow a geometric progression.

23. The system of claim 21, in which the cross-sectional areas of the remainder of the flow passages are identical to each other.

24. A flow control system comprising:
(a) a gas receiver,
(b) a source of gas under predetermined pressure,
(c) a first conduit connecting said source and said receiver,
(d) a first flow control valve in said conduit,
(e) means including a first restricted orifice in said conduit, said orifice being of a size to produce gas flow therethrough, from said predetermined pressure, at or above sonic velocity whereby to insure a fixed rate of mass flow of said gas under said predetermined pressure,
(f) a second conduit connecting said source and said receiver;
(g) a second flow control valve in said second conduit,
(h) means including a second restricted orifice in said second conduit, said second orifice being of a size to produce gas flow therethrough, from said predetermined pressure, at or above sonic velocity whereby to insure a fixed mass flow of said gas under said predetermined pressure,
(i) means for selectively actuating said first valve and said second valve individually and together;
(j) means for controlling said actuating means in response to pressure in said receiver.

25. A system as in claim 24, in which said second orifice has an effective opening bearing a selected digital ratio to the effective opening of said first orifice.

26. A system as in claim 25, in which said ratio is 2 to 1.

27. A system as in claim 24, including at least one additional conduit connected between said source and said receiver and provided with an additional flow control valve and with an additional restricted orifice, the effective area of said additional orifice bearing the same ratio of the area of said second orifice as the area of said second orifice bears to the area of said first orifice.

28. A digital fluid flow control system comprising:

a source of fluid at a first pressure;
a fluid receiver at a second pressure lower than the first pressure;
a plurality of individually actuatable, digital valve elements each having a fluid flow passage interconnecting the source to the receiver, a converging-diverging nozzle having a throat with a flow determining cross-sectional area in the flow passage, a bistable plug disposed in the flow passage, and means for positioning the plug exclusively in an open position or a closed position, the plug preventing fluid flow through the passage in the closed position and permitting fluid flow through the passage in the open position, the flow determining cross-sectional areas of at least some of the valve elements varying from one another;
the minimum difference between the first and second pressures being sufficiently high to render the pressure at the throats of the nozzles of the valve elements having open plugs independent of the second pressure;
means for sensing the dynamic conditions of the fluid in one of the manifolds; and
means responsive to the sensing means for generating binary electrical signals for positioning the plugs of the valve elements.

29. A digital fluid control system comprising:
a valve body having an upstream fluid manifold connected in the system, a downstream fluid manifold connected in the system, and a plurality of fluid flow passages interconnecting the upstream manifold to the downstream manifold; p1 a plurality of individually actuatable, digital valve elements in the respective flow passages each having a converging-diverging nozzle formed in the flow passage with a throat of a given cross-sectional area, a bistable plug in the passage, and means responsive to a binary signal for positioning the plug exclusively in an open state in which fluid flow through the passage is permitted or a closed state in which fluid flow through the passage is prevented;
the sum of the given cross-sectional areas of the throats of the nozzles being sufficiently small relative to the system in which the manifolds are connected to the pressure difference between the upstream and downstream manifolds when the plugs of all of the valve elements are in the open state is high enough to render the pressure at the throats of the nozzles of the valve elements in the open state insensitive to variations in the pressure in the downstream manifold;
means for sensing the dynamic conditions of the fluid in one of the manifolds; and
means responsive to the sensing means for generating the binary electrical signals for positioning the plugs of the valve elements.

* * * * *